J. T. WRIGHT.
Seed-Droppers.
No. 199,889. Patented Jan. 29, 1878.
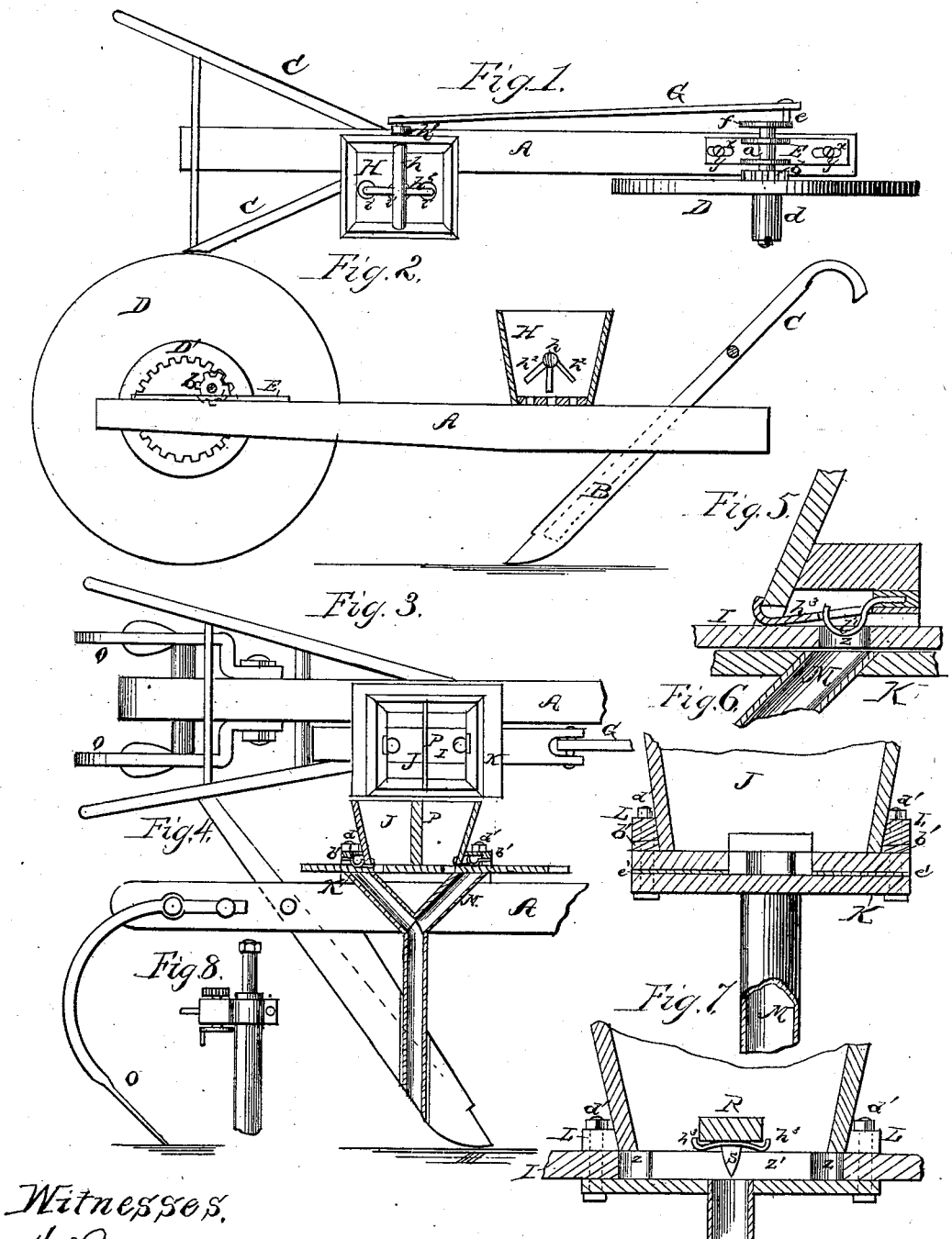

UNITED STATES PATENT OFFICE.

JOHN T. WRIGHT, OF COLUMBIA, TENNESSEE.

IMPROVEMENT IN SEED-DROPPERS.

Specification forming part of Letters Patent No. 199,889, dated January 29, 1878; application filed June 6, 1877.

*To all whom it may concern:*

Be it known that I, JOHN T. WRIGHT, of Columbia, in the county of Maury and State of Tennessee, have invented certain new and useful Improvements in Seed-Droppers; and I do hereby declare that the following is a full, clear, and exact description thereof, reference being had to the accompanying drawings, and to the letters of reference marked thereon, which form part of this specification.

The nature of my invention consists in the construction and arrangement of a cotton and corn planter, as will be hereinafter more fully set forth.

In order to enable others skilled in the art to which my invention appertains to make and use the same, I will now proceed to describe its construction and operation, referring to the annexed drawings, in which—

Figure 1 is a plan view. Fig. 2 is a side elevation, partly in section. Figs. 3 to 8 are detail views of my invention, showing the mode of dropping corn.

A represents the plow-beam, with standard B, to which latter the plow is attached. C C are the handles. These parts are the same as in any ordinary plow. On top of the beam A, at or near the front end, is secured a casting, E, which has longitudinal slots $x\,x$ in its ends, and the fastening screws or bolts $y\,y$ pass through said slots, so that the casting can be adjusted back and forth on the beam to a limited extent, as occasion may require.

In suitable bearings on this casting is placed a short shaft, $a$, carrying upon one end a pinion, $b$, which meshes with an internal cog-gear, D', set into a recess in the side of a wheel, D, said wheel being mounted upon a stud projecting from the side of the beam. The wheel D is formed with an elongated hub, $d$, as shown, so that it will not wabble on its axis.

On the other end of the shaft $a$ is secured a disk, $f$, provided with a wrist-pin, $e$, upon which is placed a pitman, G, connecting with a crank, $h^1$, upon the end of a shaft, $h$, passing transversely through the seed-box H, secured on top and to one side of the beam A. In the bottom of the box or hopper H is a series of holes, $i\,i$, and on the shaft $h$ is a series of radial arms, $h^2$, projecting downward.

When the machine is in motion, the shaft $h$ obtains a rocking motion, whereby the arms $h^2$ agitate or stir the seed, so as to cause it to fall through the perforations $i$ into the furrow made by the plow. This part of my invention is applicable for planting cotton-seed.

For planting corn, I use a box or hopper, J, provided with a flange, $b'$, around its lower end, and placed on top of a platform, K, fastened on top of the plow-beam. The box or hopper J is held to said platform by braces L L at its ends, resting on the flange $b'$, and bolts $d'$ passing through said braces, flange, and platform, as shown.

Between the hopper and platform are inserted loose strips of leather or other suitable material, for the purpose of raising the hopper any height required, so as to admit a slide of any thickness, in order to drop more or less corn at the same time. In mortises in the bottom of the hopper and under sides of the braces L are placed cut-offs $h^3$, which consist of a flat steel or brass spring of suitable dimensions, fastened to the brace, which allows the corn to pass out uninjured. Under the the cut-off $h^3$ is a block, to which is fastened a curved or round spring, $i'$, to push the corn through the hole $z$ in the slide I, to prevent its choking. This slide is connected to and operated by the pitman G. M M are the conducting-tubes for the corn from the hopper to the furrow.

To the rear end of the beam A are attached the seed-coverers O O, constructed substantially as shown.

The hopper J may have a central cross-partition, P, so as to drop two kinds of seed at the same time—that is, beans or pease—between the hills of corn.

When a single conducting-tube, M, is used, as shown in Fig. 7, the cut-off $h^3$ may be attached to a center cross-bar, R, in the bottom of the hopper, and the cut-off then provided with a beveled or rounded spur, $s$, which runs in a slot, $z'$, connecting the two holes $z\,z$ in the slide I, and answers the same purpose as the spring $i'$, above described.

It will readily be seen that the gearing above described may be applied to cultivator-beams as well as to plow-beams.

Having thus fully described my invention, what I claim as new, and desire to secure by Letters Patent, is—

1. As an attachment for the beam of a plow or cultivator, the adjustable casting E, shaft $a$, with pinion $b$ and disk $f$, the wheel D, with internal cog-gear D', and the pitman G, placed on a wrist-pin on the disk $f$, as and for the purposes herein set forth.

2. The combination of the spur $s$, attached to the cut-off $h^3$, and the slide I, having dropping-holes $z\ z$, with a groove or slot, $z'$, connecting the same, substantially as and for the purposes herein set forth.

In testimony that I claim the foregoing as my own I affix my signature in presence of two witnesses.

JOHN THOMAS WRIGHT.

Witnesses:
 SIMS LATTA,
 KNOX FLEMING.